United States Patent
Lin et al.

(10) Patent No.: US 10,318,698 B2
(45) Date of Patent: Jun. 11, 2019

(54) SYSTEM AND METHOD FOR ASSIGNING COLOR PATTERN

(71) Applicant: TAIWAN SEMICONDUCTOR MANUFACTURING CO., LTD., Hsinchu (TW)

(72) Inventors: Yen-Hung Lin, Hsinchu (TW); Yuan-Te Hou, Hsinchu (TW); Chin-Chang Hsu, New Taipei (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 57 days.

(21) Appl. No.: 15/595,863

(22) Filed: May 15, 2017

(65) Prior Publication Data
US 2018/0165406 A1 Jun. 14, 2018

Related U.S. Application Data (60) Provisional application No. 62/434,326, filed on Dec. 14, 2016.

(51) Int. Cl.
*G06F 17/50* (2006.01)
*G03F 1/70* (2012.01)

(52) U.S. Cl.
CPC ............ *G06F 17/5081* (2013.01); *G03F 1/70* (2013.01); *G06F 17/5068* (2013.01); *G06F 2217/06* (2013.01); *G06F 2217/12* (2013.01)

(58) Field of Classification Search
CPC ............ G06F 17/5081; G06F 2217/12; G06F 17/5068; G06F 2217/06; G06F 1/00; G06F 1/36; G06F 1/70; G06F 7/70283; G06F 7/70466; H01L 21/0337; G03F 1/00; G03F 1/36; G03F 1/70; G03F 7/70283; G03F 7/70466
See application file for complete search history.

(56) References Cited

U.S. PATENT DOCUMENTS

| | | | | |
|---|---|---|---|---|
| 8,448,100 B1* | 5/2013 | Lin | ............................ | G03F 1/70 716/50 |
| 8,468,470 B2* | 6/2013 | Hsu | ............................ | G03F 1/70 716/54 |
| 8,484,607 B1* | 7/2013 | Tang | .................... | G03F 7/70466 716/136 |
| 8,601,409 B1* | 12/2013 | Chen | ........................ | G06F 17/50 716/54 |
| 8,701,056 B1* | 4/2014 | Friedberg | ............. | G06F 17/5081 716/55 |

(Continued)

*Primary Examiner* — Helen Rossoshek
(74) *Attorney, Agent, or Firm* — Maschoff Brennan (57) ABSTRACT

A method includes operations below. A layout of a circuit is converted to a first conflict graph. A first vertex and a second vertex in the first conflict graph are adjusted based on first data indicating a color patterns assignment for the circuit, in order to generate a second conflict graph, in which the first vertex indicates a first pattern in the layout, and the second vertex indicates a second pattern in the layout. According to the second conflict graph, a first color pattern is assigned to both of the first pattern and the second pattern, or the first color pattern is assigned to the first pattern and a second color pattern is assigned to the second pattern, in order to generate second data for fabricating the circuit.

20 Claims, 9 Drawing Sheets

(56) References Cited

U.S. PATENT DOCUMENTS

| | | | | |
|---|---|---|---|---|
| 8,707,223 B2* | 4/2014 | Blatchford | .......... | G06F 17/5077 |
| | | | | 716/55 |
| 8,751,974 B2* | 6/2014 | Kahng | ...................... | G03F 1/70 |
| | | | | 716/110 |
| 8,914,755 B1* | 12/2014 | Hsu | ..................... | G03F 7/70433 |
| | | | | 716/55 |
| 8,943,446 B2* | 1/2015 | Arai | ................... | G06F 17/5068 |
| | | | | 716/55 |
| 9,740,814 B1* | 8/2017 | Ghosh | ....................... | G03F 7/70 |
| 9,928,336 B1* | 3/2018 | Yuan | ................... | G06F 17/5081 |
| 9,971,863 B2* | 5/2018 | Hsu | ................... | G06F 17/5081 |
| 2012/0072875 A1* | 3/2012 | Ghosh | ................ | G06F 17/5081 |
| | | | | 716/52 |
| 2014/0053118 A1* | 2/2014 | Chen | ....................... | G06F 17/50 |
| | | | | 716/52 |
| 2014/0282293 A1* | 9/2014 | Lin | .................... | G06F 17/5081 |
| | | | | 716/52 |
| 2015/0095857 A1* | 4/2015 | Hsu | .................... | G06F 17/5081 |
| | | | | 716/52 |
| 2015/0100935 A1* | 4/2015 | Lin | .................... | G06F 17/5081 |
| | | | | 716/111 |
| 2015/0363541 A1* | 12/2015 | Lin | .................... | G06F 17/5081 |
| | | | | 716/52 |
| 2017/0169154 A1* | 6/2017 | Lin | .................... | G06F 17/5068 |
| 2017/0220729 A1* | 8/2017 | Pikus | ................. | G06F 17/5072 |
| 2018/0068049 A1* | 3/2018 | Tsai | ......................... | G03F 1/36 |

* cited by examiner

SYSTEM AND METHOD FOR ASSIGNING COLOR PATTERN

PRIORITY CLAIM AND CROSS-REFERENCE

This application claims priority to U.S. Provisional Application Ser. No. 62/434,326 filed Dec. 14, 2016, which is herein incorporated by reference.

BACKGROUND

Multiple exposure or multi-patterning technology (MPT) involves forming patterns on a single layer of a substrate using two or more different masks in succession. If only two masks are used for patterning a layer, the technique is referred to as double exposure. One form of double exposure is referred to as double patterning technology (DPT). In DPT, first and second masks are used sequentially to pattern the same layer. As long as the patterns within each mask comply with the relevant minimum separation distances for the technology node, the combination of patterns formed using both masks may include smaller separations than the minimum separation distance. MPT allows line segments, and in some cases, more complex shapes to be formed of a vertical segment and a horizontal segment on the same mask. Thus, MPT provides flexibility and generally allows for significant reduction in overall IC layout.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In order to facilitate the illustration of various embodiments of the present disclosure, various terms or components regarding fabrications of semiconductor devices are introduced herein. In some embodiments, integrated circuits (IC) are fabricated by photolithographic techniques, including, for example, forming conductive lines and shapes. For example, copper lines in an interconnect layer of an IC are formed by photolithographic techniques, or a diffusion region in an active device layer of the IC is formed by the photolithographic techniques. These conductive lines and shapes are generally referred to as patterns or polygons in a layout of the IC. Using photolithography to form these patterns is also referred to as "patterning." Methods in which a single layer of an IC is exposed with two or more photomasks are referred to as multi-patterning.

For ease of visualization, patterns assigned to respectively different masks used to expose the same layer are often drawn in respectively different color patterns. Thus, the set of patterns, which are assigned to be exposed in the photoresist using a given mask, is referred to as being assigned the same "color pattern." In some embodiments, a display device is configured to display the layout of the IC, in which all circuit patterns assigned to a single photomask using the same color pattern.

In some cases, a proposed division of the patterns among three different masks results in one mask having two patterns closer to each other than a minimum separation distance, a situation referred to as a conflict. Some conflicts are able to be solved by re-assigning a pattern to a different photomask. If, however, there is no way to divide the patterns of that layer among three different masks without having two patterns in a single mask closer to each other than the minimum separation distance, there is a patterning conflict. Some conflicts are able to be resolved by a design (layout) change, or an advanced technique, including, for example, splitting a single circuit pattern into two abutting parts, each to be patterned by a respective mask, and stitched together.

Figure 1:
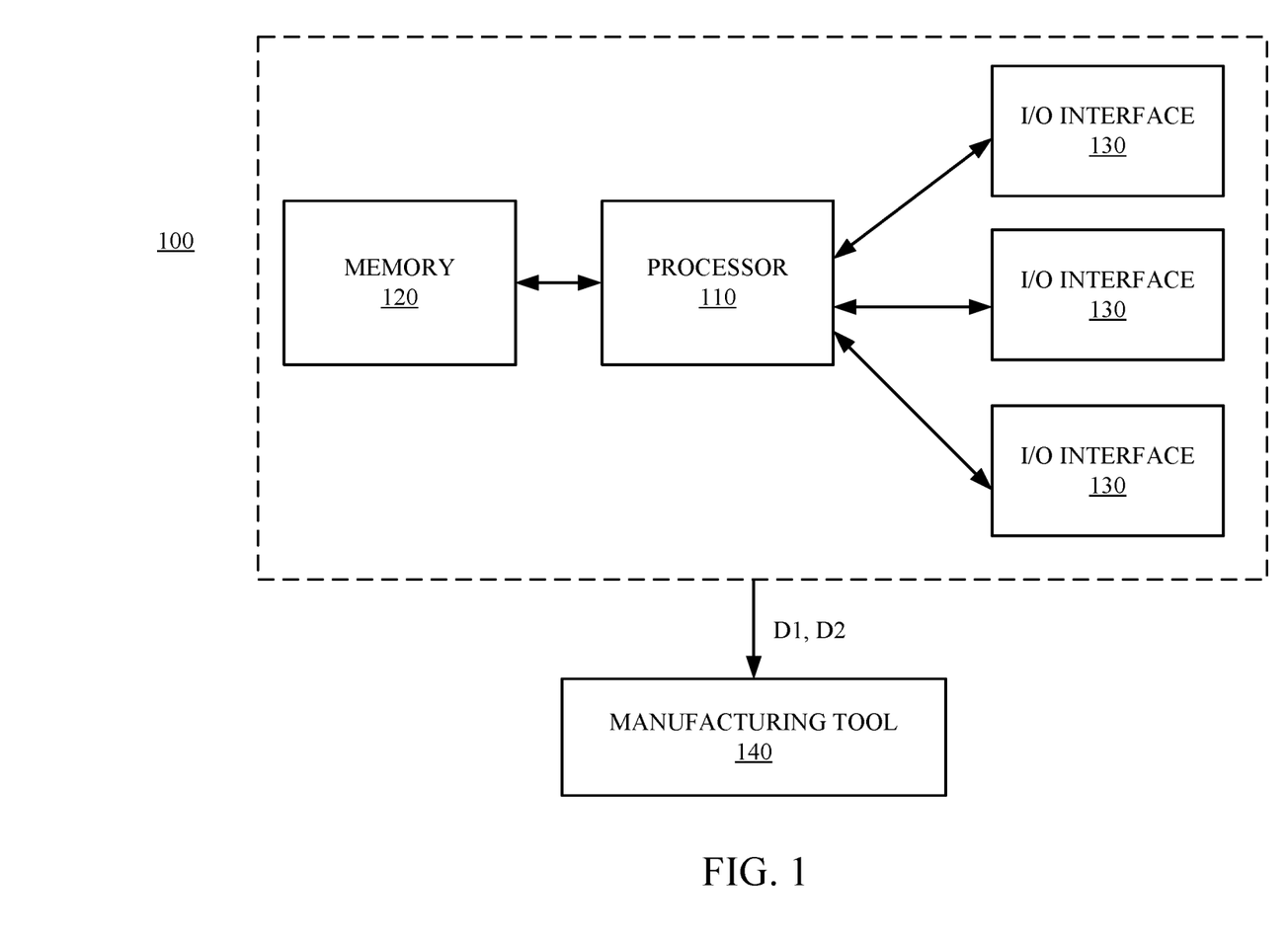
FIG. 1 is a schematic diagram of a system, in accordance with some embodiments of the present disclosure.

Reference is now made to FIG. 1. FIG. 1 is a schematic diagram of a system 100, in accordance with some embodiments of the present disclosure.

As illustratively shown in FIG. 1, the system 100 includes a processor 110, a memory 120, Input/Output (I/O) interfaces 130, and at least one manufacturing tool 140. The processor 110 is coupled to the memory 120 and the I/O interfaces 130. In various embodiments, the processor 110 is a central processing unit (CPU), an application specific integrated circuit (ASIC), a multi-processor, a distributed processing system, or a suitable processing unit. Various circuits or units to implement the processor 110 are within the contemplated scope of the present disclosure.

The memory 120 is configured to store one or more program codes for aiding design of integrating circuits. For illustration, the memory 120 stores a program code encoded with a set of instructions for assigning color patterns of the multi-patterning to patterns in a layout of a circuit (not shown). The processor 110 is able to execute the program codes stored in the memory 120, and the operations of assigning the color patterns are able to be automatically performed.

In some embodiments, the memory 120 is a non-transitory computer readable storage medium encoded with, i.e., storing, a set of executable instructions for assigning the color patterns. For illustration, the memory 120 stores executable instructions for performing operations including, for example, operations S310-S330 illustrated in FIG. 3. In some embodiments, the computer readable storage medium is an electronic, magnetic, optical, electromagnetic, infrared, and/or a semiconductor system (or apparatus or device). For example, the computer readable storage medium includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium includes a compact disk-read only memory (CD-ROM), a compact disk-read/write (CD-R/W), and/or a digital video disc (DVD).

The implementations of the memory 120 are given for illustrative purposes only. Various devices to implement the memory 120 are within the contemplated scope of the present disclosure.

In some embodiments, data D1 indicating a layout of a circuit and data D2 indicating a conflict graph (e.g., conflict graphs in FIGS. 4B, 5B, 6B, 7B, and 8B below) associated with the data D1 are stored in the memory 120. In some embodiments, the data D2 is generated from operations (e.g., operations S310-S330 discussed in FIG. 3 below) performed by the processor 110.

In some embodiments, the at least one manufacturing tool 140 is configured to retrieve the data D1 and the data D2 from the memory 120, in order to perform one or more semiconductor manufacturing processes to form structures of the circuit corresponding to the layout indicated by the data D1. In some embodiments, the semiconductor manufacturing processes includes a multiple patterning lithography process and normal processes. In some embodiments, the multiple patterning lithography process includes operations of constructing a pattern on a substrate by dividing the pattern into two or more interleaved patterns. In some embodiments, the operations of the multiple patterning lithography process include two or more exposures by using photomasks as assigned based on the data D2, forming spacers adjacent features and removing the features to provide a pattern of spacers, resist freezing, and/or other suitable processes. In some embodiments, the normal processes include various operations including deposition, removal, patterning (which performed based on the data D2), modification of electrical properties, etc.

The operations of the semiconductor manufacturing processes are given for illustrative purposes only. Various suitable operations to perform the semiconductor manufacturing processes are within the contemplated scope of the present disclosure.

The I/O interfaces 130 receive data or commands from various control devices which, for example, are operated by a circuit designer and/or a layout designer. Accordingly, the system 100 is able to be manipulated with the inputs or commands received by the I/O interfaces 130. For example, in some embodiments, the data D1 is transmitted from the I/O interfaces 130 to the memory 120. In some embodiments, the I/O interfaces 130 include a display device configured to display the status of executing the program code. In some further embodiments, the display device is configured to display patterns in a layout, and/or color patterns assignments in the patterns. In some embodiments, the I/O interfaces 130 include a graphical user interface (GUI). In some other embodiments, the I/O interfaces 130 include a keyboard, keypad, mouse, trackball, track-pad, touch screen, cursor direction keys, or the combination thereof, for communicating information and commands to processor 110.

The implementations of the I/O interfaces 130 are given for illustrative purposes only. Various devices to implement the I/O interfaces 130 are within the contemplated scope of the present disclosure.

Figure 2A:
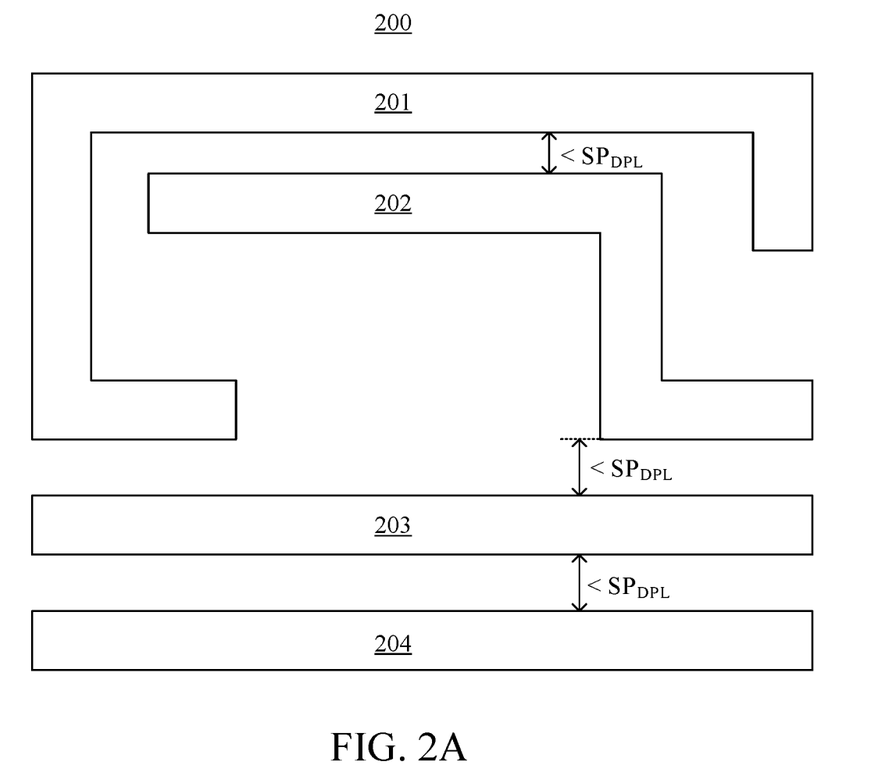
FIG. 2A is a schematic diagram of a layout of a circuit, in accordance with some embodiments of the present disclosure.

Reference is now made to FIG. 2A. FIG. 2A is a schematic diagram of a layout 200 of a circuit, in accordance with some embodiments of the present disclosure. In some embodiments, the layout 200 is generated by receiving the data D1, indicating the layout of a circuit (not shown), from the I/O interfaces 130 in FIG. 1. In some other embodiments, the layout 200 is generated by an electronic design automation (EDA) tool carried in the memory 120 in FIG. 1.

The implementations of the layout 200 are given for illustrative purposes. Various implementations of the layout 200 are within the contemplated scope of the present disclosure. In order to facilitate the illustration of a method 300 of FIG. 3 below, various terms or components regarding layout and patterns thereof are introduced with reference to FIG. 2A.

As illustratively shown in FIG. 2A, in some embodiments, the layout 200 includes patterns 201, 202, 203, and 204. In some embodiments, the patterns 201-204 are arranged to define a circuit pattern in an IC. In some cases, double patterning lithography is employed in embodiments of FIG. 2A. In other words, in the example of FIG. 2A, only two masks are employed to form the patterns 201-204 in the layout 200 during the multi-patterning. In some embodiments, for ease of visualization, the processor 110 in FIG. 1 assigns two colors patterns (not shown), corresponding to the two masks, to the patterns 201-204. In other words, two of the patterns 201-204 are expected to be assigned with a first color pattern (not shown) of double patterning, and another two of the patterns 201-204 are expected to be assigned with a second color pattern (not shown) of double patterning.

In some embodiments, a minimum separation distance $SP_{DPL}$ between the adjacent patterns is determined from the design rules and technology file for the process being used. The minimum separation distance $SP_{DPL}$ is set to ensure that the adjacent patterns are able to be clearly formed by a single photomask. In other words, two adjacent patterns are assigned different color patterns, which correspond to different masks, on condition that a distance between the two adjacent patterns is less than the minimum separation distance $SP_{DPL}$.

In the example of FIG. 2A, the distance between the pattern 201 and the pattern 202 is less than the minimum separation distance $SP_{DPL}$. The distance between the pattern 202 and the pattern 203 is less than the minimum separation distance $SP_{DPL}$. The distance between the pattern 203 and the pattern 204 is less than the minimum separation distance $SP_{DPL}$. Accordingly, in order to prevent from violating the design rules, the pattern 201 and the pattern 202 are expected to be assigned with different color patterns. The pattern 202 and the pattern 203 are expected to be assigned with different color patterns. The pattern 203 and the pattern 204 are expected to be assigned with different color patterns. In some embodiments, the system 100 in FIG. 1 is configured to assign color patterns to the patterns 201-204 in the layout 200 according to a conflict graph 200A in FIG. 2B as discussed below.

Figure 2B:
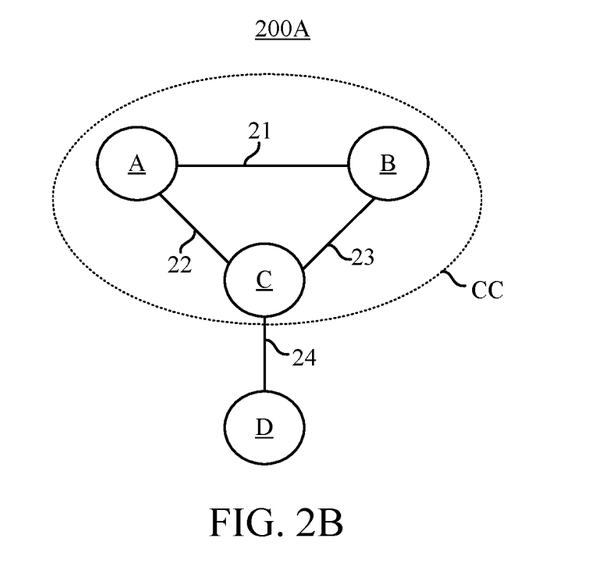
FIG. 2B is a schematic diagram of a conflict graph corresponding to the layout in FIG. 2A in accordance with some embodiments of the present disclosure.

Reference is now made to FIG. 2A and FIG. 2B. FIG. 2B is a schematic diagram of a conflict graph 200A corresponding to the layout 200 in FIG. 2A in accordance with some embodiments of the present disclosure.

In some embodiments, the conflict graph 200A is generated by the system 100 in FIG. 1, in order to assign color patterns to the patterns 201-204 in the layout 200, and to detect whether a conflict is present in the color patterns assignment. In some embodiments, a designer is able to input data indicating the conflict graph 200A to the system 100 in FIG. 1 via the I/O interfaces 130 in FIG. 1. Accordingly, at least one of the EDA tool carried in the memory 120 in FIG. 1 is activated to perform the operations of the color patterns assignment and/or conflict detection according to the conflict graph 200A. In some other embodiments, the processor 110 is configured to perform at least one design-aiding tool to process the data indicating the layout 200 in FIG. 2A, in order to generate the conflict graph 200A. The configurations of the conflict graph 200A are given for illustrative purposes. Various configurations of the conflict graph 200A are within the contemplated scope of the present disclosure.

In some embodiments, the conflict graph 200A is utilized to show the spacing relation among the patterns 201-204 in FIG. 2A. For illustration, the conflict graph 200A includes vertices A, B, C, and D, and edges 21-24. The vertices A, B, C, and D correspond to the patterns 201-204 in FIG. 2A, respectively. The edges 21-24 are generated based on the arrangements of the patterns 201-204 in FIG. 2A. For example, in FIG. 2A, the pattern 201 is disposed adjacent to the patterns 202 and 203. Accordingly, in the conflict graph 200A, the vertex A, which corresponds to the pattern 201, is coupled to the vertex B which corresponds to the pattern 202 via the edge 21. The vertex A is also coupled to the vertex C which corresponds to the pattern 203 via the edge 22. In the layout 200 in FIG. 2A, the pattern 203 is disposed between the pattern 201 and the pattern 204. Accordingly, in the conflict graph 200A in FIG. 2B, the vertex A is coupled to the vertex D which corresponds to the pattern 204 via the edge 22, the vertex C, and the edge 24. With the same analogy, the rest connections among the vertices B, C, and D in FIG. 2B are able to be generated based on the layout 200 in FIG. 2A.

In some embodiments, the processor 110 in FIG. 1 is configured to perform at least one of the EDA tool carried in the memory 120 in FIG. 1, in order to sequentially assign color patterns to patterns 201-204 in the layout 200 in FIG. 2A based on the vertices A-D in the conflict graph 200A. In an example of employing the double patterning, two color patterns are alternately assigned to the patterns 201-204 based on the vertices A-D. For example, based on the order of the vertices A-D, a first color pattern is assigned to the pattern 201 corresponding to the vertex A, a second color pattern is assigned to the pattern 202 corresponding to the vertex B. Then, the first color pattern is assigned to the pattern 203 corresponding to the vertex C, a second color pattern is assigned to the pattern 204 corresponding to the vertex D.

In some embodiments, the system 100 is configured to detect whether a conflict, which violates certain design rules, is presented in the layout 200 based on the conflict graph 200A. As discussed above, in the layout 200, the pattern 201 and the pattern 202 are expected to be assigned with different color patterns, and the pattern 202 and the pattern 203 are expected to be assigned with different color patterns. In the example of employing the double patterning, a conflict is present in the patterns 201, 202, 203, and 204. For example, as discussed above, the pattern 201 is assigned with the first color pattern, and the pattern 202 is assigned with the second color pattern. As a result, there is no an appropriate color pattern to be assigned to the pattern 203 since the pattern 203 is expected to be assigned with a color pattern different from the color patterns assigned to the patterns 201 and 202. In some embodiments, when the conflict is detected, the processor 110 is configured to send a message via the I/O interfaces 130, in order to notify a designer to revise the layout 200 or revise the color patterns assignment.

In some embodiments, on condition that the double-patterning is employed, the system 100 is configured to check whether a closed cycle, which is formed with an odd number of vertices, is present in the conflict graph 200A, in order to detect the conflict in the layout 200. For example, in the conflict graph 200A, the three vertices A, B, and C form a closed cycle CC. As discussed above, the patterns 201-203, which correspond to three vertices A, B, and C in the closed cycle CC, have the conflict therebetween. Effectively, in the example of employing the double-patterning, the closed cycle CC is able to indicate that the conflict is present in the layout 200.

Explained in a different way, in the example of using the double-patterning, patterns corresponding to two adjacent vertices are assigned with different color patterns, in order to prevent from violating the design rules. Therefore, if a closed cycle forming by the odd number of vertices is present in the conflict graph, it indicates that a conflict will be present in the color patterns assignment corresponding to the odd number of vertices.

For illustrative purposes only, the above embodiments are discussed with reference to examples employing double-patterning. Various numbers of patterns used in multi-patterning are within the contemplated scope of the present disclosure. For example, in some other embodiments, on condition that an even number of patterns are employed, the system 100 is also able to check whether the closed cycle, which is formed with the odd number of vertices, is present in the conflict graph 200A, in order to detect the conflict in the layout 200.

The following paragraphs describe certain embodiments related to the system 100 to illustrate functions and applications thereof. However, the present disclosure is not limited to the following embodiments. Various arrangements are able to implement the functions and the operations of the system 100 in FIG. 1 are within the contemplated scope of the present disclosure.

Figure 3:
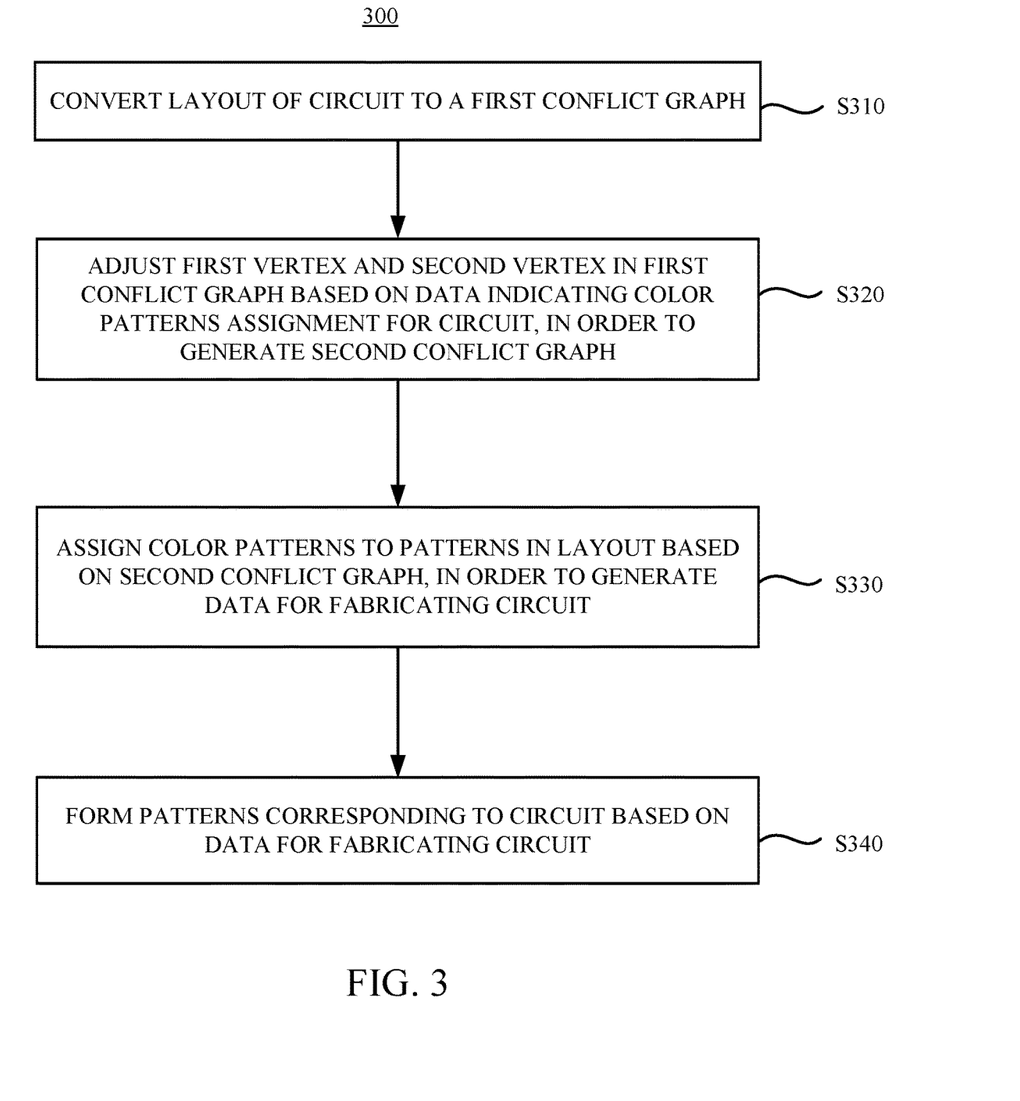
FIG. 3 is a flow chart of a method, in accordance with some embodiments of the present disclosure.

FIG. 3 is a flow chart of a method 300, in accordance with some embodiments of the present disclosure. In some embodiments, the system 100 in FIG. 1 is configured to perform the method 300 to assign color patterns to patterns in the layout for a circuit. For ease of understanding, reference is now made to FIGS. 1-3, and the operations of the method 300 are described with the system 100. In some embodiments, the method 300 includes operations S310, S320, S330, and S340.

In operation S310, the layout of a circuit is converted to a first conflict graph. For illustration, in some embodiments, at least one EDA tool carried in the memory 120 in FIG. 1 is activated by the processor 110, to decompose the layout 200 in FIG. 2A to generate the conflict graph 200A in FIG. 2B. Alternatively, in some other embodiments, the processor 110 is able to receive data indicating the conflict graph 200A via the I/O interfaces 130 in FIG. 1.

In operation S320, a first vertex and a second vertex in the first conflict graph are adjusted based on first data indicating a color patterns assignment for the circuit, in order to generate a second conflict graph. In some embodiments, the processor 110 is able to receive the first data via the I/O interfaces 130 in FIG. 1. In some embodiments, the first data includes information of color patterns assignment. The information of color patterns assignment is configured to specify how color patterns are assigned to the patterns in the layout. The detailed descriptions regarding operation S320 will be provided below with reference to FIGS. 4A-4C, 5A-5B, 6A-6B, 7A-7B, and 8A-8B below.

In operation S330, the color patterns are assigned to patterns in the layout based on the second conflict graph, in order to generate second data for fabricating the circuit. In some embodiments, after the second conflict graph in operation S320 is generated, the processor 110 is able to perform at least one EDA tool carried in the memory 120 in FIG. 1, to assign color patterns to the patterns in the layout, in order to generate the second data (e.g., data D2 in FIG. 1) that contains information of arrangements of the patterns and the corresponding designated color patterns. In some embodiments, as discussed above, the second data include information indicating the second conflict graph (e.g., conflict graphs discussed in FIGS. 4C, 5B, 6B, 7B, and 8B below).

In operations S340, patterns corresponding to the circuit are formed based on the data generated in operation S330. For illustration, after the operation S330, the processor 110 transmits the second data (e.g., data D2 in FIG. 1) to the at least one manufacturing tool 140 in FIG. 1, in order to initiate at least one manufacturing process (e.g., photolithography) to fabricate the circuit.

For example, in some conditions (e.g., embodiments discussed in FIGS. 4C, 5A-5B, and 6A-6B below), patterns in the layout of the circuit are assigned with the same color pattern based on the data D2. Under this condition, the at least one manufacturing tool 140 utilizes the same photomask, which corresponds to the color pattern, to perform the semiconductor manufacturing processes, in order to form structures corresponding to the patterns (e.g., patterns 402-403 in FIGS. 4C, 5B, and 6B) in the circuit on a substrate (not shown). In some alternative conditions (e.g., embodiments discussed in FIGS. 7B and 8B below), patterns in the layout of the circuit are assigned with the different color patterns based on the data D2. Under this condition, the at least one manufacturing tool 140 utilizes different photomasks, which corresponds to the color patterns respectively, to perform one or more operations of the semiconductor manufacturing processes, in order to form structures corresponding to the patterns (e.g., patterns 402-403 in FIGS. 7B and 8B) in the circuit on a substrate (not shown). In these conditions, the semiconductor manufacturing processes may include the operations of the multiple patterning lithography process, the operations of the normal processes as discussed above, or a combination thereof.

The above description of the method 300 includes exemplary operations, but the operations of the method 300 are not necessarily performed in the order described. The order of the operations of the method 300 disclosed in the present disclosure are able to be changed, or the operations are able to be executed simultaneously or partially simultaneously as appropriate, in accordance with the spirit and scope of various embodiments of the present disclosure.

In some alternative embodiments, the method 300 is implemented as a design tool carried on a non-transitory computer-readable medium. In other words, the method 300 is able to be implemented in hardware, software, firmware, and the combination thereof. For illustration, if speed and accuracy are determined to be paramount, a mainly hardware and/or firmware vehicle is selected and utilized. Alternatively, if flexibility is paramount, a mainly software implementation is selected and utilized. Various arrangements to implement the method 300 are within the contemplated scope of the present disclosure.

Figure 4A:
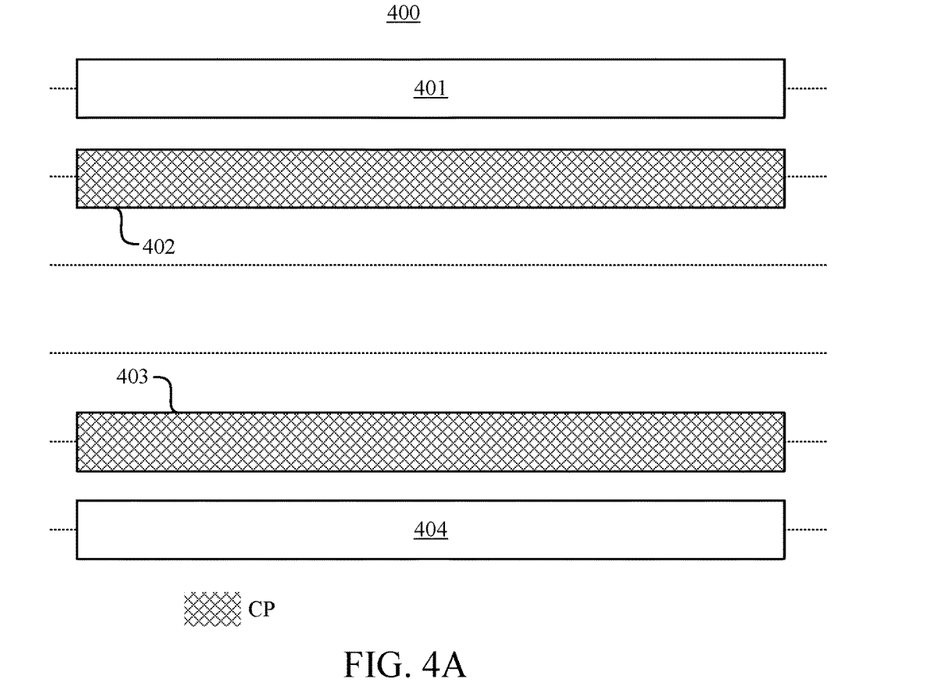
FIG. 4A is a schematic diagram of a layout of a circuit, in accordance with some embodiments of the present disclosure.
Figure 4B:
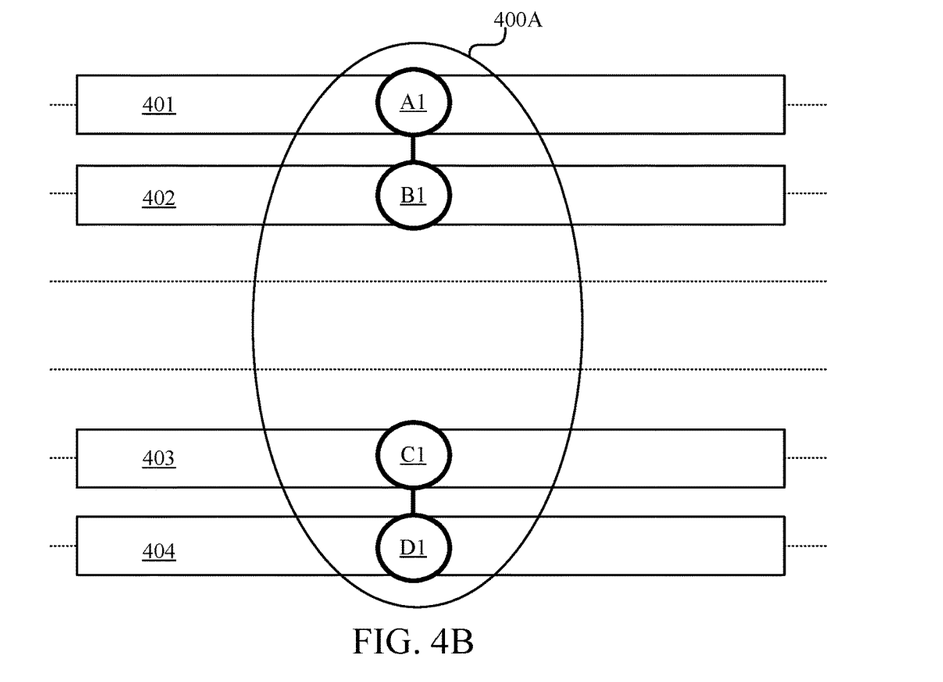
FIG. 4B is a schematic diagram illustrating a first conflict graph corresponding to the layout in FIG. 4A, in accordance with some embodiments of the present disclosure.

Reference is now made to FIG. 4A and FIG. 4B. FIG. 4A is a schematic diagram of a layout 400 of a circuit, in accordance with some embodiments of the present disclosure. FIG. 4B is a schematic diagram illustrating a first conflict graph 400A corresponding to the layout 400 in FIG. 4A, in accordance with some embodiments of the present disclosure. With respect to the embodiments of FIG. 4A, like elements in FIG. 4B are designated with the same reference numbers for ease of understanding.

As shown in FIG. 4A, the layout 400 includes four patterns 401, 402, 403, and 404. In some embodiments, the patterns 401-404 correspond to shapes of elements in the circuit (not shown). In the example of FIG. 4A, the double-patterning is employed, and the patterns 402 and 403 are assigned with the same color pattern, which is illustrated with the color pattern CP, based on the first data as discussed in operation S320.

In some embodiments, with similar operations discussed in FIG. 2B, the processor 110 generates the first conflict graph 400A that includes vertices A1, B1, C1, and D1, based on the layout 400. The vertices A1, B1, C1, and D1 correspond to the patterns 401, 402, 403, and 404 in FIG. 4A, respectively. The edges that connect the vertices A1, B1, C1, and D1 are also generated based on the arrangements of the patterns 401, 402, 403, and 404. For illustration, as the patterns 401 and 402 are disposed adjacent to each other, the corresponding vertices A1 and B1 are coupled to each other via one edge. As the patterns 403 and 404 are disposed adjacent to each other, the corresponding vertices C1 and D1 are coupled to each other via another one edge.

As discussed above, in the example of using the double-patterning, patterns corresponding to two adjacent vertices are assigned with different color patterns. As shown in FIG. 4B, if there is no specific requirements (for example, color patterns assignment specified in the first data), the patterns 401 and 402 will be assigned with different color patterns, and the patterns 403 and 404 will be assigned with different color patterns. For example, in the example of employing the double-patterning, the pattern 401 is assigned with a first color pattern, and the pattern 402 is assigned with a second color pattern. The pattern 403 is assigned with one of the first color pattern and the second color pattern, and the pattern 404 is assigned with another one of the first color pattern and the second color pattern. In other words, based on the first conflict graph 400A in FIG. 4B, the patterns 402 and 403 may be assigned with the same color pattern or different color patterns if there is no specific requirements.

Figure 4C:
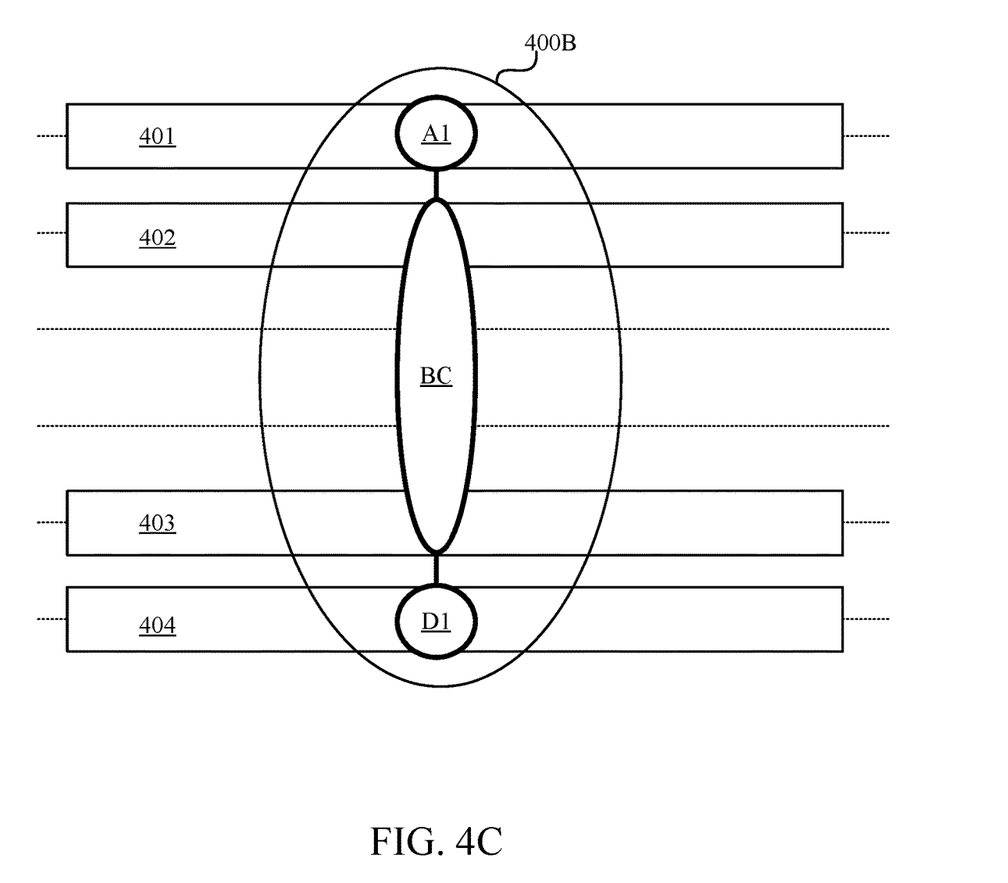
FIG. 4C is a schematic diagram illustrating a second conflict graph generated by operation in FIG. 3 based on the first conflict graph in FIG. 4B, in accordance with some embodiments of the present disclosure.

Reference is now made to FIG. 4C. FIG. 4C is a schematic diagram illustrating a second conflict graph 400B generated by operation S320 in FIG. 3 based on the first conflict graph 400A in FIG. 4B, in accordance with some embodiments of the present disclosure. With respect to the embodiments of FIG. 4B, like elements in FIG. 4C are designated with the same reference numbers for ease of understanding.

As discussed above, based on the first data as discussed in operation S320 in FIG. 3, the patterns 402 and 403 are expected to be assigned with the same color pattern CP. In some embodiments, the processor 110 in FIG. 1 is configured to activate at least one EDA tool carried in the memory 120 in FIG. 1, in order to perform operation S320 to generate the second conflict graph 400B based on the first conflict graph 400A.

In some embodiments, on condition that, based on the first data, patterns in a layout are assigned with the same color pattern, the processor 110 is configured to merge the vertices which correspond to the patterns assigned with the same color pattern, in the first conflict graph as a single vertex, in order to generate the second conflict graph. For illustration, in the example of FIGS. 4A and 4B, the patterns 402 and 403 are assigned with the same color pattern CP. The processor 110 virtually merges the vertices B1 and C1, which respectively correspond to the patterns 402 and 403, as a single vertex BC in FIG. 4C, in order to generate the second conflict graph 400B. In some embodiments, the term "virtually" indicates that operations discussed in the present disclosure are performed by a series of data-processing and/or data computations.

As shown in FIG. 4C, there is no conflict present in the second conflict graph 400B, and as the patterns 402 and 403 correspond to the same vertex BC, the patterns 402 and 403 will be assigned with the same color pattern CP in FIG. 4A in operation S330 in FIG. 3 based on the second conflict graph 400B. In the example of employing the double-patterning, based on the order the vertices A1, BC, and D1, the pattern 401 corresponding to the vertex A1 is assigned with a first color pattern, the patterns 402-403 corresponding to the vertex BC are assigned with a second color pattern (i.e., color pattern CP), and the pattern 404 corresponding to the vertex D1 is assigned with the first color pattern.

Figure 5A:
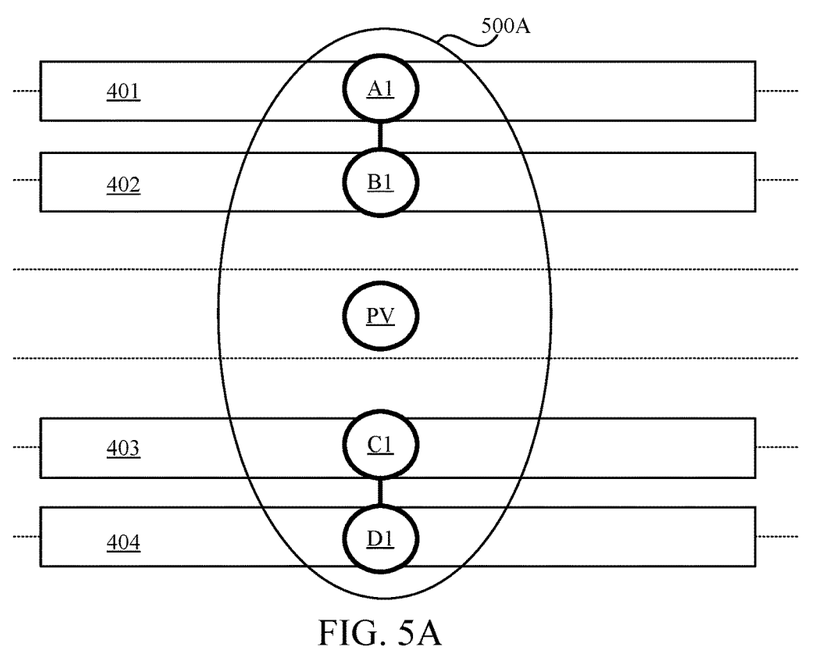
FIG. 5A is a schematic diagram illustrating a first conflict graph corresponding to the layout in FIG. 4A, in accordance with some embodiments of the present disclosure.
Figure 5B:
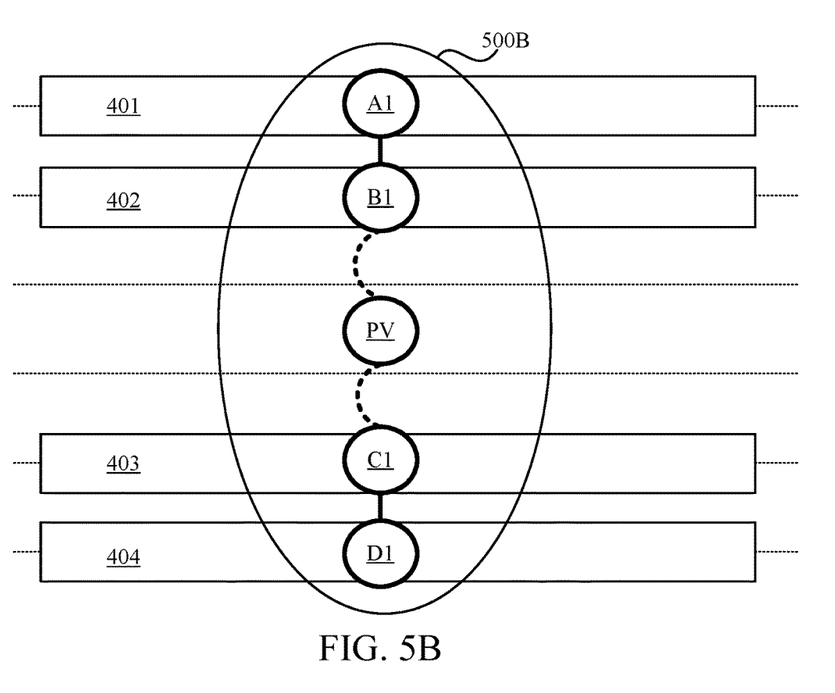
FIG. 5B is a schematic diagram illustrating a second conflict graph generated by operation in FIG. 3 based on the first conflict graph in FIG. 5A, in accordance with some embodiments of the present disclosure.

Reference is now made to FIG. 5A and FIG. 5B. FIG. 5A is a schematic diagram illustrating a first conflict graph 500A corresponding to the layout 400 in FIG. 4A, in accordance with some embodiments of the present disclosure. FIG. 5B is a schematic diagram illustrating a second conflict graph 500B generated by operation S320 in FIG. 3 based on the first conflict graph 500A in FIG. 5A, in accordance with some embodiments of the present disclosure. With respect to the embodiments of FIGS. 4A-4C, like elements in FIGS. 5A-5B are designated with the same reference numbers for ease of understanding.

In some embodiments, on condition that patterns in a layout are assigned with the same color pattern, the processor 110 is configured to add a pseudo vertex that connects between vertices, which correspond to the patterns assigned with the same color pattern, in the first conflict graph, in order to generate the second conflict graph. In some embodiments, the term "pseudo" indicates that there is no physical pattern present in the layout corresponds to this vertex. For illustration, the patterns 402 and 403 in FIG. 5A are expected to be assigned with the same color pattern CP as discussed in FIG. 4A above. As shown in FIG. 5A, the processor 110 virtually adds a pseudo vertex PV between the vertices B1 and C1 in the first conflict graph 500A. Then, as shown in FIG. 5B, the processor 110 virtually couples the vertex B1 to the vertex C1 via the pseudo vertex PV and additional edges (illustrated with dashed lines), in order to generate the second conflict graph 500B. Effectively, with the pseudo vertex PV, the vertices B1 and C1 are adjusted to be not adjacent vertices. Accordingly, in the example of using the double-patterning, the patterns 402 and 403 will be assigned with the same color pattern based on the second conflict graph 500B.

For example, based on the second conflict graph 500B, the pattern 401 and the pattern 404, which correspond to the vertex A1 and the vertex D1 respectively, will be assigned with a first color pattern of the double-patterning. As there is no physical pattern corresponds to the pseudo vertex PV, the color patterns assignment corresponding to the pseudo vertex PV will be omitted. The patterns 402 and 403, which correspond to the vertices B1 and C1 respectively, will be assigned with a second color pattern (e.g., color pattern CP in FIG. 4A) of the double-patterning.

Figure 6A:
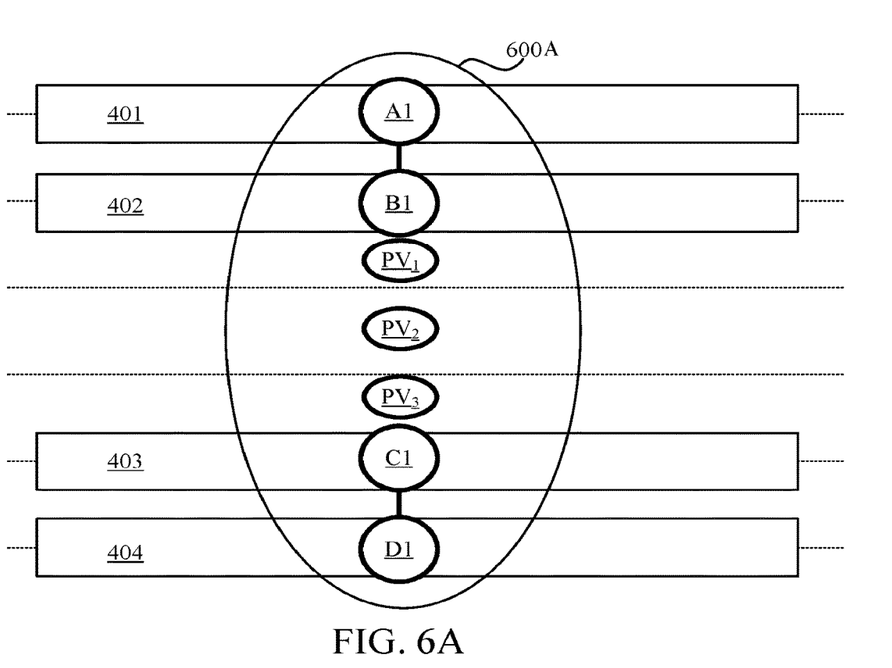
FIG. 6A is a schematic diagram illustrating a first conflict graph corresponding to the layout in FIG. 4A, in accordance with some embodiments of the present disclosure.
Figure 6B:
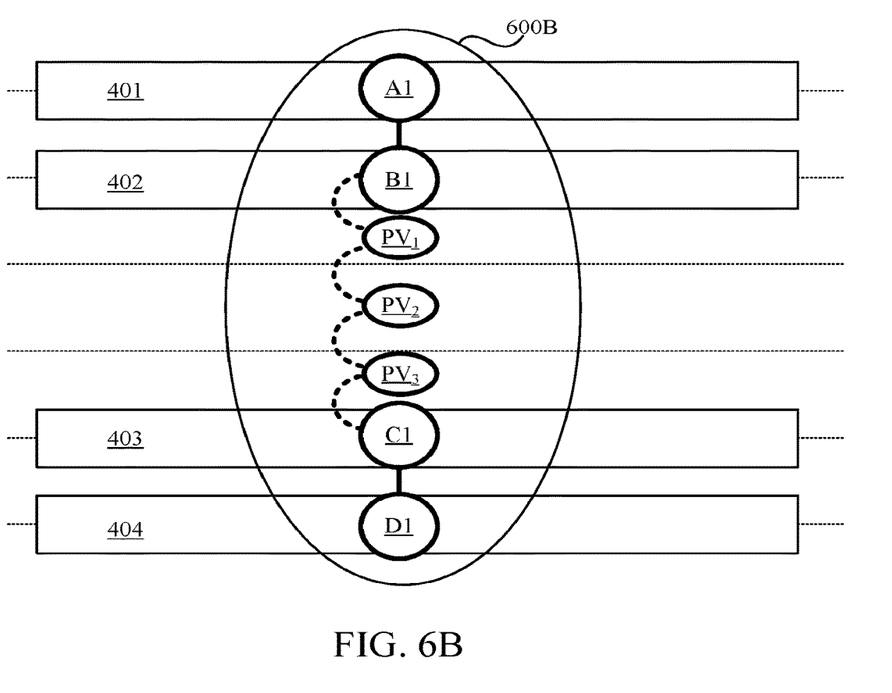
FIG. 6B is a schematic diagram illustrating a second conflict graph generated by operation in FIG. 3 based on the first conflict graph in FIG. 6A, in accordance with some embodiments of the present disclosure.

Reference is now made to FIG. 6A and FIG. 6B. FIG. 6A is a schematic diagram illustrating a first conflict graph 600A corresponding to the layout 400 in FIG. 4A, in accordance with some embodiments of the present disclosure. FIG. 6B is a schematic diagram illustrating a second conflict graph 600B generated by operation S320 in FIG. 3 based on the first conflict graph 600A in FIG. 6A, in accordance with some embodiments of the present disclosure. With respect to the embodiments of FIGS. 5A-5B, like elements in FIGS. 6A-6B are designated with the same reference numbers for ease of understanding.

In some embodiments, on condition that patterns in a layout are assigned with the same color pattern, the processor 110 is configured to add an odd number of pseudo vertices that connect between vertices, which correspond to the patterns assigned with the same color pattern, in the first conflict graph, in order to generate the second conflict graph. For illustration, the patterns 402 and 403 in FIG. 6A are expected to be assigned with the same color pattern CP as discussed in FIG. 4A above. As shown in FIG. 6A, the processor 110 virtually adds an odd number of pseudo vertices $PV_1, PV_2, \ldots, P_{2n+1}$ between the vertices B1 and C1 in the first conflict graph 600A. In some embodiments, n is an integer greater than or equal to 1.

For ease of understanding, an example of using three pseudo vertices $PV_1$, $PV_2$, and $PV_3$ (i.e., n is set to be 1) is shown in FIG. 6B. As shown in FIG. 6B, the processor 110 virtually couples the vertex B1 to the vertex C1 via the pseudo vertices $PV_1$, $PV_2$, and $PV_3$ and additional edges (illustrated with dashed lines), in order to generate the second conflict graph 600B. Effectively, with the same analogy discussed in FIG. 5B, the vertices B1 and C1 are adjusted to be not adjacent vertices. Moreover, with the odd number of pseudo vertices $PV_1, PV_2, \ldots, P_3$, in the example of using the double-patterning, the patterns 402 and 403 will be assigned with the same color pattern.

For example, based on the second conflict graph 600B, the pattern 401, and the pattern 404, which correspond to the vertex A1 and the vertex D1 respectively, will be assigned with a first color pattern of the double-patterning. The pattern 402 and the pattern 403, which correspond to the vertex B1 and the vertex C1 respectively, will be assigned with a second color pattern (e.g., color pattern CP in FIG. 4A) of the double-patterning. As there is no physical patterns correspond to the pseudo vertices $PV_1$, $PV_2$, and $PV_3$, the color patterns assignment corresponding to these pseudo vertices will be omitted.

Figure 7A:
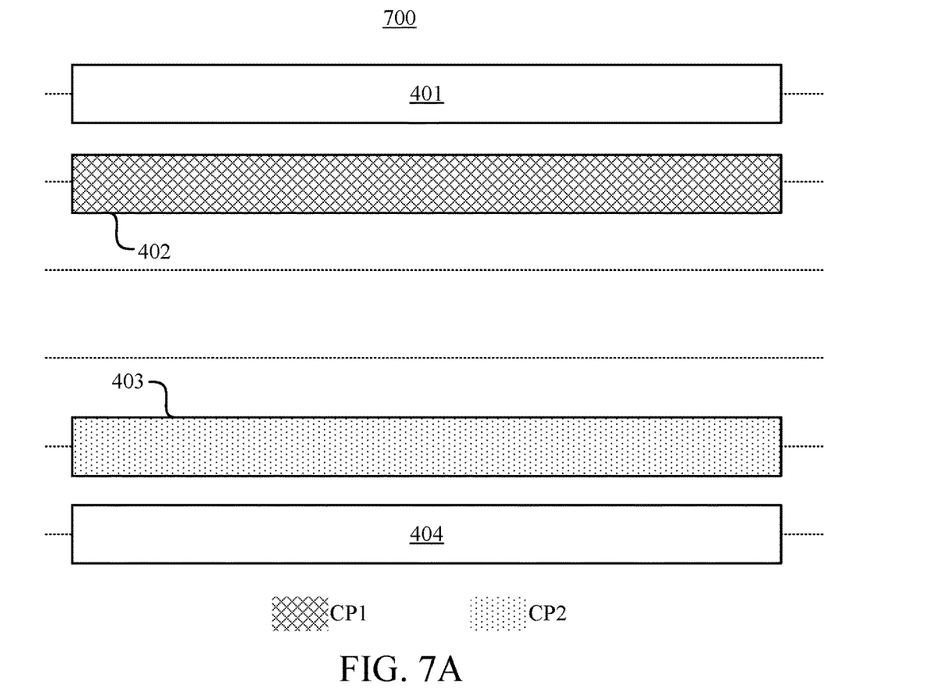
FIG. 7A is a schematic diagram of a layout of a circuit, in accordance with some embodiments of the present disclosure.

Reference is now made to FIG. 7A. FIG. 7A is a schematic diagram of a layout 700 of a circuit, in accordance with some embodiments of the present disclosure. With respect to the embodiments of FIGS. 4A and 4B, like elements in FIG. 7A are designated with the same reference numbers for ease of understanding.

Compared with the layout 400 in FIG. 4A, based on the color patterns assignment specified in the first data, the pattern 401 in the layout 700 is assigned with a first color pattern CP1 of the double-patterning, and the pattern 402 in the layout 700 is assigned with a second color pattern CP2 of the double-patterning. In other words, in the example of FIG. 7A, the patterns 402 and 403 are expected to be assigned with different color patterns.

Figure 7B:
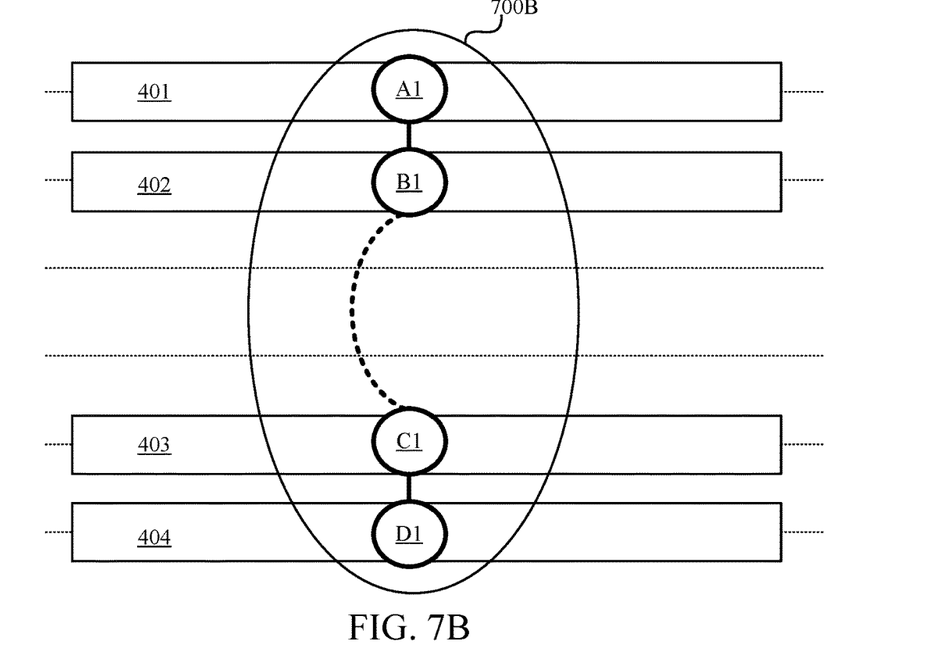
FIG. 7B is a schematic diagram illustrating a second conflict graph corresponding to the layout in FIG. 7A, in accordance with some embodiments of the present disclosure.

Reference is now made to FIG. 7B. FIG. 7B is a schematic diagram illustrating a second conflict graph 700B corresponding to the layout 700 in FIG. 7A, in accordance with some embodiments of the present disclosure. With respect to the embodiments of FIGS. 4B and 7A, like elements in FIG. 7B are designated with the same reference numbers for ease of understanding.

In some embodiments, on condition that patterns in a layout are assigned with different color patterns, the processor 110 is configured to couple vertices, which correspond to the patterns assigned with different color patterns, in the first conflict graph to each other, in order to generate the second conflict graph. In the example of FIG. 7B, the processor 110 virtually adds an additional edge (illustrated with dashed lines) to couple the vertices B1 and C1 of the first conflict graph 400A in FIG. 4B, in order to generate the second conflict graph 700B. Compared with FIGS. 5B and 6B, the vertices B1 and C1 in FIG. 7B are directly coupled with each other via the additional edge. Effectively, the vertices B1 and C1 in FIG. 7B in the second conflict graph 700B are now adjacent vertices. Accordingly, in the example of using the double-patterning, the patterns 402 and 403 corresponding to the vertices B1 and C1 will be assigned with different color patterns based on the second conflict graph 700B.

For example, based on the second conflict graph 700B, the pattern 401 and the pattern 403, which correspond to the vertex A1 and the vertex C1 respectively, are assigned with a first color pattern of the double-patterning. The pattern 402 and the pattern 404, which correspond to the vertex B1 and the vertex D1 respectively, are assigned with a second color pattern of the double-patterning.

Figure 8A:
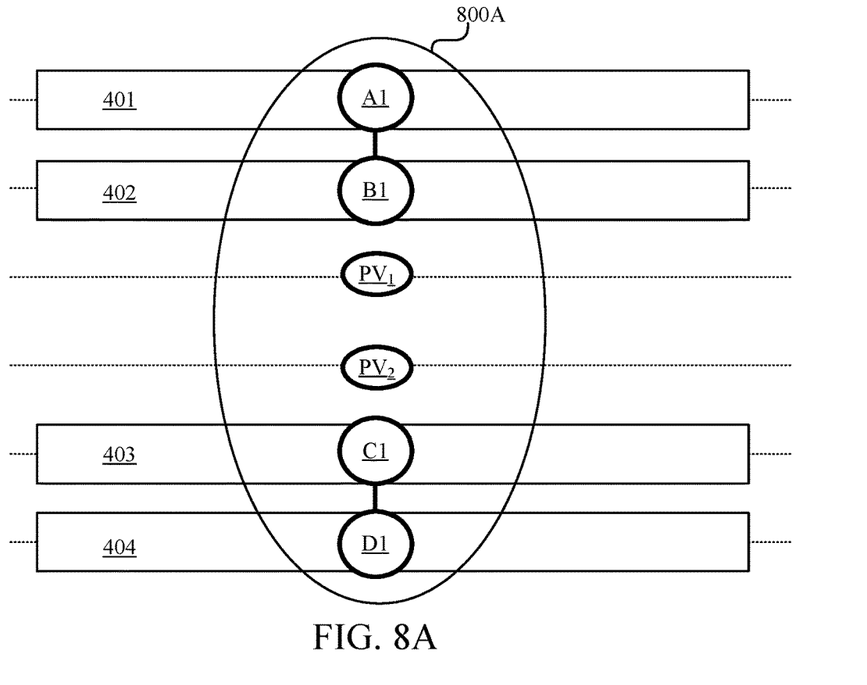
FIG. 8A is a schematic diagram illustrating a first conflict graph corresponding to the layout in FIG. 7A, in accordance with some embodiments of the present disclosure.
Figure 8B:
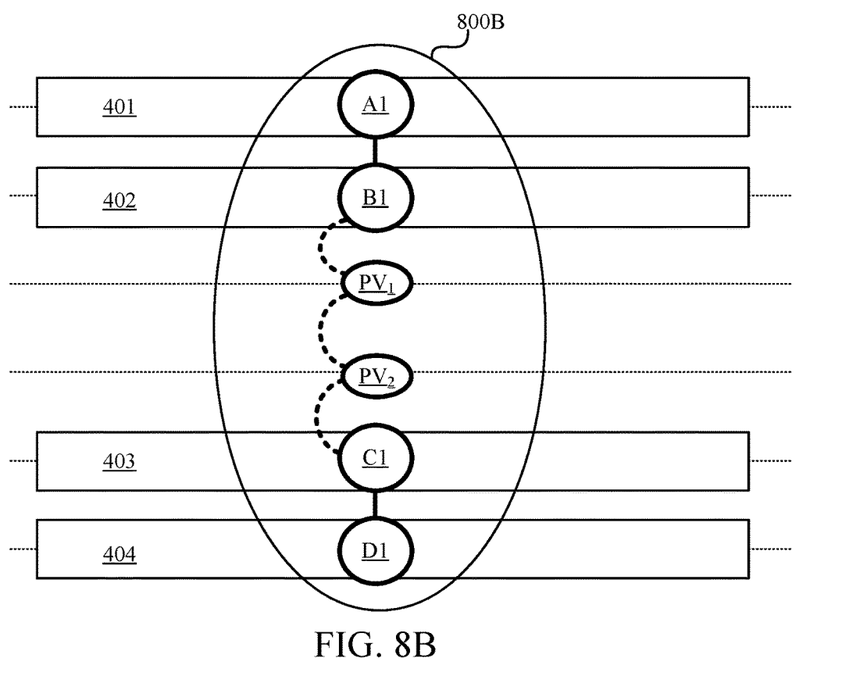
FIG. 8B is a schematic diagram illustrating a second conflict graph generated by operation in FIG. 3 based on the first conflict graph in FIG. 8A, in accordance with some embodiments of the present disclosure.

Reference is now made to FIG. 8A and FIG. 8B. FIG. 8A is a schematic diagram illustrating a first conflict graph 800A corresponding to the layout 700 in FIG. 7A, in accordance with some embodiments of the present disclosure. FIG. 8B is a schematic diagram illustrating a second conflict graph 800B generated by operation S320 in FIG. 3 based on the first conflict graph 800A in FIG. 8A, in accordance with some embodiments of the present disclosure. With respect to the embodiments of FIGS. 7A and 7B, like elements in FIGS. 8A-8B are designated with the same reference numbers for ease of understanding.

In some embodiments, on condition that patterns in a layout are assigned with different color patterns, the processor 110 is configured to add an even number of pseudo vertices that connect between vertices, which correspond to the patterns assigned with different color patterns, in the first conflict graph, in order to generate the second conflict graph. In the example of FIG. 8B, the processor 110 virtually adds an even number of pseudo vertices PV1, . . . , PV2n and additional edges (illustrated with dashed lines) to couple the vertices B1 and C1 in FIG. 8A, in order to generate the second conflict graph 800B. In some embodiments, n is an integer greater than or equal to 1. Effectively, the vertices B1 and C1 in the second conflict graph 800B are able to be assigned with different color patterns.

For ease of understanding, an example of using two pseudo vertices PV1 and PV2 (i.e., n is set to be 1) is shown in FIG. 8B. As shown in FIG. 8B, the processor 110 virtually couples the vertex B1 to the vertex C1 via the pseudo vertices PV1 and PV2 and additional edges (illustrated with dashed lines), in order to generate the second conflict graph 800B. Based on the second conflict graph 800B, the pattern 401 and the pattern 403, which correspond to the vertex A1 and the vertex C1 respectively, will be assigned with a first color pattern (e.g., color pattern CP1 in FIG. 7A) of the double-patterning. The pattern 402 and the pattern 404, which correspond to the vertex Bland the vertex D1 respectively, will be assigned with a second color pattern (e.g., color pattern CP2 in FIG. 7A) of the double-patterning. As there is not physical patterns correspond to the pseudo vertices PV1 and PV2, the color patterns assignment corresponding these pseudo vertices will be omitted.

As described above, with operation S320 in FIG. 3, a specific color patterns assignment for patterns in a layout can be achieved. As a result, the conflict in color patterns assignments can be removed, and the operations of detecting the conflicts in the multi-patterning in further applications are able to be performed more efficiently.

For ease of understanding, the embodiments above are described with double patterning lithography. In various embodiments, multi-patterning, which has two or more color pattern and are able to be employed with the method 300 in FIG. 3, is within the contemplated scope of the present disclosure.

In this document, the term "coupled" may also be termed as "electrically coupled," and the term "connected" may be termed as "electrically connected". "Coupled" and "connected" may also be used to indicate that two or more elements cooperate or interact with each other.

In some embodiments, a method is disclosed that includes operations below. A layout of a circuit is converted to a first conflict graph. A first vertex and a second vertex in the first conflict graph are adjusted based on first data indicating a color patterns assignment for the circuit, in order to generate a second conflict graph, in which the first vertex indicates a first pattern in the layout, and the second vertex indicates a second pattern in the layout. According to the second conflict graph, a first color pattern is assigned to both of the first pattern and the second pattern, or the first color pattern is assigned to the first pattern and a second color pattern is assigned to the second pattern, in order to generate second data for fabricating the circuit.

Also disclosed is a system that includes a memory configured to store computer program codes, and a processor. The memory is configured to store computer program codes. The processor is configured to execute the computer codes in the memory to perform operations below. Vertices in a first conflict graph are adjusted based on a first data indicating a color patterns assignment associated with the vertices, in order to generate a second conflict graph. According to the second conflict graph, the same color pattern or different color patterns are assigned to patterns, which correspond to the vertices, in a circuit, in order to generate second data for fabricating the circuit.

Also disclosed is a system that includes a memory configured to store computer program codes, and a processor. The memory is configured to store computer program codes. The processor is configured to execute the computer codes in the memory to perform operations below. Based on a color patterns assignment for a first pattern and a second pattern in a layout, a first vertex corresponding to the first pattern is coupled to a second vertex corresponding to the second pattern in a first conflict graph, in order to generate a second conflict graph. One or more color patterns are assigned to the first pattern and the second pattern, in order to generate data for fabricating a circuit corresponding to the layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
converting, by a processor, a layout of a circuit to a first conflict graph;
adjusting, by the processor, a first vertex and a second vertex in the first conflict graph based on a first data indicating a color patterns assignment for the circuit, in order to generate a second conflict graph, wherein in the second conflict graph, the first vertex and the second vertex are adjusted to be a single vertex, or to be coupled to each other directly or via at least one pseudo vertex, the first vertex indicates a first pattern in the layout, the second vertex indicates a second pattern in the layout, and the at least one pseudo vertex indicates that no physical pattern corresponding to the at least one pseudo vertex is present in the layout; and
assigning, by the processor, according to the second conflict graph, a first color pattern to both of the first pattern and the second pattern, or the first color pattern to the first pattern and a second color pattern to the second pattern, in order to generate a second data; and
forming, by at least one manufacturing tool, the circuit based on the second data.

2. The method of claim 1, wherein adjusting the first vertex and the second vertex comprises:
on condition that the first color pattern is determined, based on the first data, to be assigned to both of the first pattern and the second pattern, merging the first vertex and the second vertex as the single vertex to generate the second conflict graph.

3. The method of claim 1, wherein adjusting the first vertex and the second vertex comprises:
on condition that the first color pattern is determined, based on the first data, to be assigned to both of the first pattern and the second pattern, adding the at least one pseudo vertex between the first vertex and the second vertex, wherein a number of the at least one pseudo vertex is one; and
coupling the first vertex to the second vertex via the at least one pseudo vertex, in order to generate the second conflict graph.

4. The method of claim 1, wherein the at least one pseudo vertex has an odd number of pseudo vertices, and adjusting the first vertex and the second vertex comprises:
on condition that the first color pattern is determined, based on the first data, to be assigned to both of the first pattern and the second pattern, adding the odd number of pseudo vertices between the first vertex and the second vertex; and
coupling the first vertex to the second vertex via the odd number of pseudo vertices, in order to generate the second conflict graph.

5. The method of claim 1, wherein adjusting the first vertex and the second vertex comprises:
on condition that the first color pattern is determined, based on the first data, to be assigned to the first pattern and the second color pattern is assigned to the second pattern, coupling the first vertex to the second vertex, in order to generate the second conflict graph.

6. The method of claim 5, wherein the first vertex and the second vertex are directly coupled with each other.

7. The method of claim 1, wherein the at least one pseudo vertex has an even number of pseudo vertices, and adjusting the first vertex and the second vertex comprises:
on condition that the first color pattern is determined, based on the first data, to be assigned to the first pattern and the second color pattern is assigned to the second pattern, adding the even number of pseudo vertices between the first vertex and the second vertex; and
coupling the first vertex to the second vertex via the even number of pseudo vertices, in order to generate the second conflict graph.

8. A system, comprising:
a memory configured to store computer program codes;
a processor configured to execute the computer program codes in the memory to:
adjust a first vertex and a second vertex in a plurality of vertices in a first conflict graph based on a first data indicating a color patterns assignment associated with the plurality of vertices, in order to generate a second conflict graph, wherein in the second conflict graph, the first vertex and the second vertex are adjusted to be a single vertex, or to be coupled to each other directly or via at least one pseudo vertex, and the at least one pseudo vertex indicates no physical pattern corresponding to the at least one pseudo vertex is present in a layout of a circuit; and assign, according to the second conflict graph, the same color pattern or different color patterns to patterns, which correspond to the plurality of vertices, in the circuit, in order to generate a second data; and at least one manufacturing tool configured to form the circuit based on the second data.

9. The system of claim 8, wherein the processor is further configured to execute the computer program codes in the memory to:

convert the layout of the circuit to the first conflict graph.

10. The system of claim 8, wherein on condition that the patterns corresponding to the plurality of vertices are determined to be assigned with the same color pattern, the processor is further configured to execute the computer program codes in the memory to:

merge the plurality of vertices as the single vertex to generate the second conflict graph.

11. The system of claim 8, wherein on condition that the patterns corresponding to the plurality of vertices are determined to be assigned with the same color pattern, the processor is further configured to execute the computer program codes in the memory to:

add the at least one pseudo vertex between the plurality of vertices, wherein a number of the at least one pseudo vertex is one; and couple the plurality of vertices with each other via the at least one pseudo vertex, in order to generate the second conflict graph.

12. The system of claim 8, wherein the at least one pseudo vertex has an odd number of pseudo vertices, and on condition that the patterns corresponding to the plurality of vertices are determined to be assigned with the same color pattern, the processor is further configured to execute the computer program codes in the memory to:

add the odd number of pseudo vertices between the plurality of vertices; and couple the plurality of vertices with each other via the odd number of pseudo vertices, in order to generate the second conflict graph.

13. The system of claim 8, wherein on condition that the patterns corresponding to the plurality of vertices are determined to be assigned with different color patterns, the processor is further configured to execute the computer program codes in the memory to:

couple the plurality of vertices with each other, in order to generate the second conflict graph.

14. The system of claim 13, wherein the plurality of vertices are directly coupled with each other.

15. The system of claim 8, wherein the at least one pseudo vertex has an even number of pseudo vertices, and on condition that the patterns corresponding to the plurality of vertices are determined to be assigned with different color patterns, the processor is further configured to execute the computer program codes in the memory to:

add the even number of pseudo vertices between the plurality of vertices; and couple the plurality of vertices with each other via the even number of pseudo vertices, in order to generate the second conflict graph.

16. A system, comprising:

a memory configured to store computer program codes;

a processor configured to execute the computer program codes in the memory to:

based on a color patterns assignment for a first pattern and a second pattern in a layout, couple a first vertex corresponding to the first pattern to a second vertex corresponding to the second pattern in a first conflict graph directly or via at least one pseudo vertex, or as a single vertex, in order to generate a second conflict graph, wherein the at least one pseudo vertex indicates that no physical pattern corresponding to the at least one pseudo vertex is present in the layout; and assign one or more color patterns to the first pattern and the second pattern, in order to generate a data; and at least one manufacturing tool configured to form a circuit corresponding to the layout based on the data.

17. The system of claim 16, wherein on condition that, based on the color patterns assignment, the first pattern and the second pattern are determined to be assigned with the same color pattern, the processor is further configured to execute the computer program codes in the memory to:

merge the first vertex and the second vertex as the single vertex, in order to generate the second conflict graph.

18. The system of claim 16, wherein the at least one pseudo vertex has an odd number of pseudo vertices, and on condition that, based on the color patterns assignment, the first pattern and the second pattern are determined to be assigned with the same color pattern, the processor is further configured to execute the computer program codes in the memory to:

add the odd number of pseudo vertices between the first vertex and the second vertex; and couple the first vertex to the second vertex via the odd number of pseudo vertices, in order to generate the second conflict graph.

19. The system of claim 16, wherein on condition that, based on the color patterns assignment, the first pattern and the second pattern are determined to be assigned with different color patterns, the processor is further configured to execute the computer program codes in the memory to:

directly couple the first vertex to the second vertex, in order to generate the second conflict graph.

20. The system of claim 16, wherein the at least one pseudo vertex has an even number of pseudo vertices, and on condition that, based on the color patterns assignment, the first pattern and the second pattern are determined to be assigned with different color patterns, the processor is further configured to execute the computer program codes in the memory to:

add the even number of pseudo vertices between the first vertex and the second vertex; and couple the first vertex to the second vertex via the even number of pseudo vertices, in order to generate the second conflict graph.

* * * * *